(12) United States Patent
Voser et al.

(10) Patent No.: US 6,359,287 B1
(45) Date of Patent: *Mar. 19, 2002

(54) APPARATUS FOR DETECTING AN EDGE OF A DOCUMENT

(75) Inventors: Christian Voser, Onex; Didier Rossel, Grand-Lancy, both of (CH); Derek Hutchinson, Wokingham (GB)

(73) Assignee: Mars Incorporated, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/665,344

(22) Filed: Sep. 19, 2000

Related U.S. Application Data

(62) Division of application No. 09/101,433, filed as application No. PCT/GB97/00129 on Jan. 16, 1997, now Pat. No. 6,188,080.

(30) Foreign Application Priority Data

Jan. 16, 1996 (GB) ............................................... 9600825

(51) Int. Cl.[7] ............................................... G01N 21/86
(52) U.S. Cl. .................. 250/559.36; 250/556
(58) Field of Search .............................. 250/556, 223 R, 250/227.31, 559.36, 559.4; 356/71, 376, 386

(56) References Cited

U.S. PATENT DOCUMENTS

| | | |
|---|---|---|
| 4,500,202 A | 2/1985 | Smyth |
| 4,520,270 A | 5/1985 | Enter et al. |

(List continued on next page.)

FOREIGN PATENT DOCUMENTS

| | | |
|---|---|---|
| EP | 0 067 898 A | 12/1982 |
| EP | 0 220 022 | 4/1987 |
| EP | 0 558 338 | 9/1993 |
| EP | 0 587 179 A | 3/1994 |
| EP | 0 592 005 | 4/1994 |
| GB | 2 029 007 | 3/1980 |
| GB | 2 095 828 | 10/1982 |
| GB | 2 101 301 | 1/1983 |
| WO | WO 93/23827 | 11/1993 |

OTHER PUBLICATIONS

Abstract of Japanese Publication No. 01 272470, Published Oct. 31, 1989, Saito Itaru et al.

*Primary Examiner*—Que T. Le
(74) *Attorney, Agent, or Firm*—Fish & Richardson P.C.

(57) ABSTRACT

A module (28) for sensing the edges of a banknote as it passes through the module. The module consists of an array of LEDs (32) optically coupled to a light diffusing element (36) past which the banknote moves. A CCD array (40) has photoelectric conversion elements coupled to the path in which the banknote moves by a self-focusing fiber-optic lens array (38). The CCD array consists of four segments (42, 44, 46, 48) having individual shift registers which are read out in parallel, and converted to digital signals by a number of comparators (56). The comparators compare the CCD pixel output with individual threshold levels which are stored in a digital memory (54). The pixel threshold levels are converted to an analog signal for comparison with the CCD output signals by digital to analog converters (54). The digital data streams produced are divided into series of data which are analyzed to determine the presence of an optical transition in the corresponding pixel series of the CCD arrays. If a transition is identified, the location of the pixel series is transmitted to a memory (58) for use in banknote validation.

8 Claims, 2 Drawing Sheets

U.S. PATENT DOCUMENTS

| | | |
|---|---|---|
| 4,559,451 A | 12/1985 | Curl |
| 4,610,542 A | 9/1986 | Ringlien |
| 4,638,354 A | 1/1987 | Denimal |
| 4,680,806 A | 7/1987 | Bolza-Schunemann |
| 4,855,607 A | 8/1989 | Eckl |
| 4,973,851 A | 11/1990 | Lee |
| 5,006,719 A | 4/1991 | Blaser |
| 5,020,110 A | 5/1991 | Chominski |
| 5,034,616 A * | 7/1991 | Bercovitz .................. 250/556 |
| 5,095,204 A | 3/1992 | Novini |
| 5,140,166 A | 8/1992 | Gerlier |
| 5,216,724 A | 6/1993 | Suzuki et al. |
| 5,256,868 A * | 10/1993 | Kaplan et al. ........... 250/208.1 |
| 5,363,949 A | 11/1994 | Matsubayashi |
| 5,381,021 A | 1/1995 | Polidoro |
| 5,489,784 A | 2/1996 | Koiranen et al. |
| 6,172,745 B1 * | 1/2001 | Voser et al. .................. 356/71 |

* cited by examiner

APPARATUS FOR DETECTING AN EDGE OF A DOCUMENT

This is a divisional application of U.S. Ser. No. 09/101,433 filed on Jul. 9, 1998, now U.S. Pat. No. 6,188,080, which is a 371 of PCT/GB97/00129 filed on Jan. 16, 1997.

BACKGROUND

This invention relates to apparatus for determining the location of an edge of a document, and in particular, but not exclusively, to a position sensing means for use in a banknote validator.

Various types of banknote validator are known. One such type is a banknote validator using an optical sensing head which illuminates a banknote and senses the spectral response of the banknote to determine whether the banknote paper and/or the printing inks are genuine. Such validators are described in U.S. Pat. Nos. 5,140,166 and 5,381,021. A banknote passing through a transport mechanism is sensed using an optical head. Because the transport mechanism pre-aligns the banknote with a lateral edge before the banknote is sensed, the lateral position of the banknote is known. The position of the banknote as it moves through the transport mechanism can be determined simply by sensing the leading and trailing edges of the banknote.

However, banknote validators using such a pre-alignment mechanism are able to process banknotes only at a limited rate due to the need for mechanical pre-alignment of banknotes entering the transport mechanism.

British patent application GB 2029007 describes a banknote validator incorporating a width and length detection arrangement. The banknote is passed through a light curtain consisting of a number of photosensors arranged in a line across a transport path for banknotes. The leading and trailing edges of the banknotes are sensed, the number of intervening scan pulses being counted in order to determine the banknote length. Meanwhile, the width of the banknote is determined by counting the number of darkened photodiodes after the banknote enters the light curtain. A serial diode signal (SDS), which is read out from a shift register, exhibits logic 1 and logic 0 states, and the number of 1s counted is a measure of the width of the banknote. The banknote is always prealigned, as the lower edge of the banknote moves on a sliding surface during movement through the light curtain.

In an arrangement described in U.S. Pat. No. 4,855,607, an array of photodiodes is used in conjunction with a deskewing mechanism for sensing the skew of a moving mail piece and then deskewing the mail piece. In an example given of a transmissive photosensor, the skew of the moving mail piece is detected by changes in the number and location of the individual photosensors which are occluded during each sampling period as the mail piece moves into the apparatus. The speed of asymmetric drive motors are varied according to the sensed skew, in order to align the mail piece with a transfer writing head.

In a further arrangement described in Texas Instruments product brochure "Showcase" issue 20, at page 9, a line imager is described which is suitable for the sensing of banknotes. The line imager is a charge mode imager, with the analog voltage per pixel proportional to the product of the light intensity on the pixel and the exposure time. The analog output voltages are shifted out serially, and 16 grey scales of output are possible. It is stated to be suitable for reading black and white documents, and measuring marks or edges.

SUMMARY

According to one aspect of the present invention there is provided apparatus for determining the location of an edge of a document on a transport path, said apparatus comprising:

means for sensing points distributed across said transport path to produce a data series identifying said location by a transition occurring therein; and processing means for dividing said series of data into a plurality of sets of data each comprising three or more data items and corresponding to a series of the sensed points, and for analysing said sets to detect said transition.

This aspect of the invention provides for increased processing speeds for the data produced by the sensing means.

It is therefore possible to provide a position sensing module for a high speed banknote validator which is able to supply the evaluation circuitry of such an mechanism with an accurate description of the edge positioning of a banknote as it enters a transport mechanism.

It is therefore also possible to provide a sensing means which is able to produce outputs from a shift register means receiving charges from an array of photodetectors and process those outputs at high speeds. The sensing module may therefore repeatedly scan a large number of pixels across the banknote in a relatively short period.

Preferably, the sensing means is for producing a plurality of contemporaneous outputs, said produced data is in the form of a plurality of data streams and said operating means is for operating on said data streams in parallel to detect a transition occurring in any of said data streams.

Such parallel processing of contemporaneous outputs from the sensing provides for a higher speed of processing than a conventional serial processing method.

According to a further aspect of the invention there is provided apparatus for determining the location of an edge of a document on a transport path, said apparatus comprising means for sensing points distributed across said transport path to produce a data series identifying said location by a transition occurring therein, and processing means for detecting said transition and selectively retaining a part of said data series at which said transition occurs, in response to detecting said transition.

This aspect of the invention provides for high speed preprocessing of the data produced by the sensing means, reducing the amount of data to be processed at a later stage to identify the edge locations of a document on the transport path.

Another aspect of the invention provides apparatus for detecting the location of an edge of a document moving along a transport path, comprising light source means, means for diffusing light from said light source means for back-lighting said document, a linear light-detector array for sensing light transmitted via said diffusing means, and focusing means for generally focusing said light-detector array both on said document and on the adjacent surface of said diffusing means.

This aspect provides for a high definition of transitions occurring at the document edges. The diffusing means can be used both to homogenize the light produced by said light source means and to provide a fixed focusing plane for the focusing of the light detector array.

BRIEF DESCRIPTION OF THE DRAWINGS

An embodiment of the present invention will now be described, by way of example only, with reference to the accompanying diagrams, in which.

DETAILED DESCRIPTION

Rather than requiring pre-alignment of a banknote being validated, it has been proposed to produce a high speed banknote validation apparatus which is able to cope with banknotes passing under a surface characteristic sensing head with random alignments whilst sensing the spectral characteristics of predetermined areas of the surface of the banknote. Such an optical head is described in our co-pending International patent application filed on even date herewith, and claiming priority from British patent application No. 9600853.7 with an Agent's Reference of J25223 WO. The evaluation circuitry associated with such an optical head may utilise a validation algorithm, such as that disclosed in European patent application No. 0 560 023, which identifies and validates the spectral response characteristics of predetermined areas of a banknote being sensed. These areas may vary in position under the optical head depending on the offset and skew positioning of the banknote as it passes through the mechanism.

Figure 1:
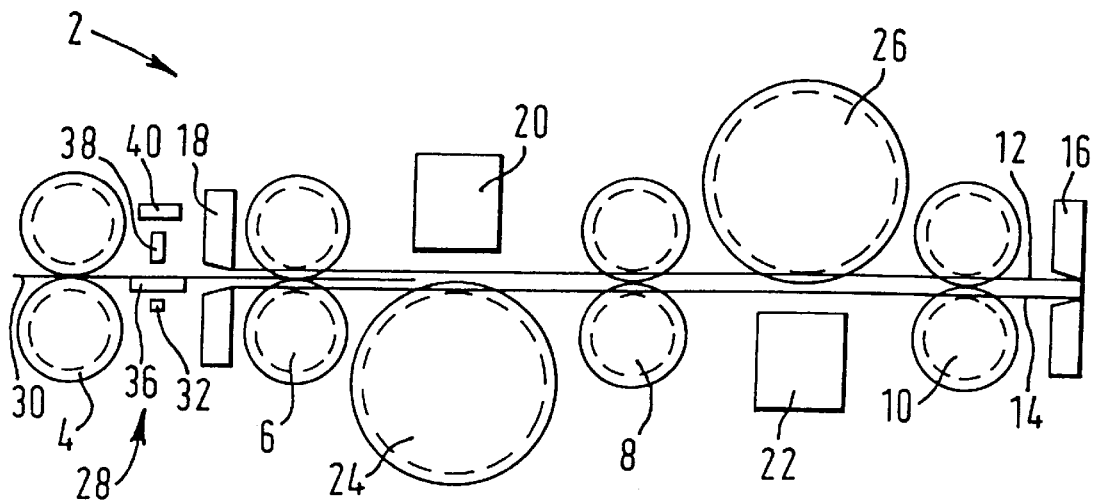
FIG. 1 shows a side view of components of a banknote validator apparatus.

Referring first to FIG. 1, a banknote validator 2 has a transport mechanism similar to that described in International patent application No. WO 96/10808, incorporated herein by reference. The transport mechanism has an entrance defined by nip rollers 4, a transport path defined by further nip rollers 6, 8 and 10, upper wire screen 12 and lower wire screen 14. The wire screens 12 and 14 are attached at one end, which is located between the first set of nip rollers 4 and the second set of nip rollers 6, to entrance wire supports 18, and at the other end to exit wire supports 16.

An upper surface characteristic sensing head 20 is located above the transport path to sense the spectral characteristics of pixels across the upper surface of a banknote 30 passing through the mechanism, and a lower surface characteristic sensing head 22 is located, horizontally spaced from the upper surface characteristic sensing head 20 by the third set of nip rollers 8, below the transport path of the banknote 30 to sense the spectral characteristics of pixels across the lower surface of the banknote 30. Reference drums 24 and 26 are located to oppose the sensing modules 20 and 22 respectively so as to provide reflective surfaces whereby the sensing devices 20 and 22 can be calibrated. Upper wire screen 12 consists of a plurality of evenly spaced guide wires, and the lower wire screen 14 consists of a similar plurality of evenly spaced guide wires, between which a transport path is defined along which the banknote 30 is driven by the nip rollers 6, 8 and 10.

An edge sensing module 28, according to this embodiment of the present invention, has an illuminating means located on one side of the transport path of the apparatus 2 and a charge coupled device (CCD) array located on the other side of the transport path. The module 28 is mounted between entrance nip rollers 4 and the entrance wire supports 18. Thus, the wire screens 12 and 14 do not obscure the detection area of the edge sensing module 28.

Figure 2:
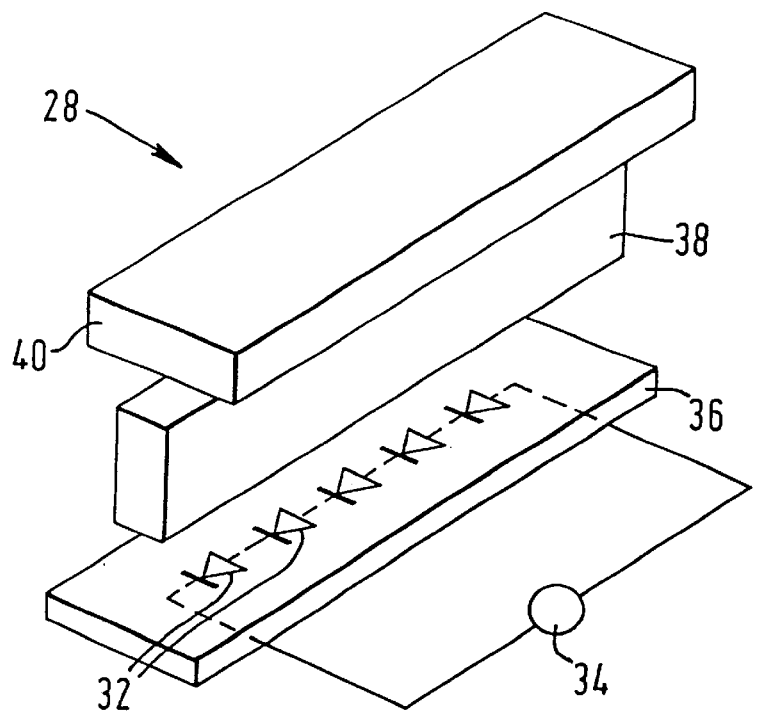
FIG. 2 shows in perspective view a position sensing module according to the present invention.

Referring to FIG. 2, it can be seen that the edge sensing module 28 includes a linear array of LEDs 32 extending across the transport path of the validator 2. For illustrative purposes, only 5 LEDs 32 are shown, but more may be used in practice. The LEDs 32 are driven in a current sharing arrangement by a current generator 34. The LEDs 32 are located below and optically coupled to a light diffusing plate 36. The diffusing plate 28 is located such that the banknote 30 contacts its upper surface as it moves through the entrance to the validator. A "self-focusing" fibre-optic lens array 28 such as the lens array marketed under the name "SELFOC" (registered trade mark) is located to receive light from a banknote illuminated from below by diffusing element 36 and to convey the light to a CCD array 40.

Figure 3:
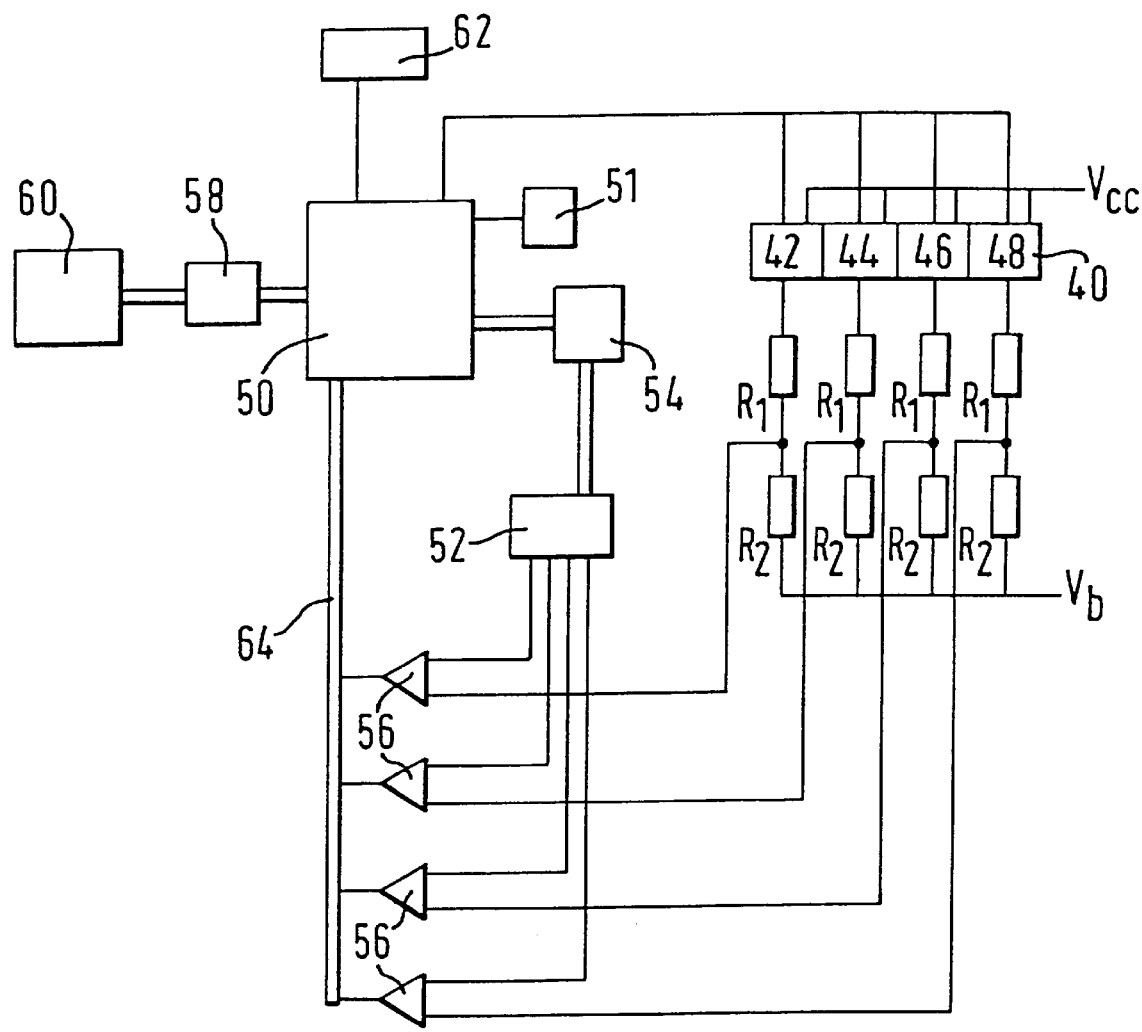
FIG. 3 shows an electronic circuit diagram for the position sensor of FIG. 2.

Referring now to FIG. 3, the CCD array 40, such as that which is available from the manufacturer Hitachi under the model reference TCD128BAC, consists of four CCD array segments, aligned in a colinear fashion end to end. Each CCD segment has a plurality of, for example 432, photoelectric converting elements capable of sensing light input from a plurality of pixels located across the transport path.

Each segment 42, 44, 46 and 48 of CCD array 40 is provided with an individual shift register receiving charges from its respective photoelectric converting elements. The shift registers are each individually clocked to produce an analog time-varying voltage output.

In this embodiment of the present invention the shift registers of each of the CCD segments 42, 44, 46 and 48 are driven in parallel. Thus, the time required for each scan of the entire CCD array is reduced. The CCD segments 42, 44, 46 and 48 are driven by clocking pulses generated by a processing and control means 50, which in this embodiment is an ASIC formed from a programmable gate array. A masked ASIC or another network of logic parts would also be suitable. The CCD array segments 42, 44, 46 and 48 are provided with an input voltage $V_{cc}$ and each produces a series of outputs corresponding to the level of illumination of each of its pixel elements in turn.

Processing and control means 50 is driven by a 16 MHz clock pulse generator 51. The scan rate of the CCD array 40 is linked to a movement encoder 62 which senses movement of a banknote through the edge sensing module 28. Encoder 62 triggers a CCD scan-initiating, i.e. load, pulse regularly, for example for every millimeter of movement of the banknote.

The dark current output from each of the CCD array segments 42, 44, 46 and 48 may be between 3.5 and 7.5 V when $V_{cc}$ is at 12 V. Exposure to light of a photoelectric converting element to saturation level has the effect of reducing the corresponding output signal by up to 1 V, and therefore the signals directly output from the CCD array 40 may range from 2.5 V (light saturated output level) to 7.5 V (dark output level). In order to match the output voltages of the CCD array segments 42, 44, 46 and 48 with the input range of each of four digital to analog converters (DACs) 52 having a range of 0 V to 5 V, the CCD outputs are biased using a negative supply rail biasing voltage $V_b$ and voltage dividing resistors R1 and R2. The equation for the biasing is:

$$Vout = \frac{KVin + Vb}{K + 1}$$

Where K is the ratio $$\frac{R2}{R1}$$

and Vb=−15 V

With the given range of the DAC being 0 V to 5 V, the ideal value of K is approximately 6.4 at which the lowest pixel output, at a light saturated output level (Vin is 2.5 V) is close to the bottom of the DAC output range (Vout is 0.14 V) and the highest pixel output, at a dark output level (Vin is 7.5 V) is close to the top of the DAC output range (Vout is 4.5 V).

Threshold levels are stored for each CCD pixel as digital values in memory 43 which are addressed by processing and control unit 50 in synchronism with the CCD shift register read-out pulses. Thus, the DACs 52 convert four digital threshold levels stored in memory 54 per pixel output period. This produces four analog reference voltage outputs which are compared with the four biased pixel outputs from the CCD sensor segments 42, 44, 46 and 48 in comparators 56.

Both the power inputs to the LEDs 32 and the reference threshold levels stored in memory 54 are subject to calibration. In order to set the power to be input to the light sources 32, a standard intermediate reference threshold is applied to all pixels, and the power input to the light sources 32 is gradually increased from a low level until control unit 50 determines that all biased pixel outputs produce a logical 1 output from the comparators 56. The calibrated input current level is stored in a memory (not shown) associated with processing and control unit 50. This light source intensity calibration is not of critical sensitivity, since it is required only to set a light level to which all pixels of the CCD array 40 should be sufficiently sensitive.

In order to calibrate the pixel reference threshold levels, the light sources 32 are energised with the calibrated input current and a scan of CCD array 40 is taken in order to produce a set of first reference levels corresponding to the biased output signals from each CCD pixel at a full input light intensity.

A second set of reference levels is produced by scanning the CCD array 40 without any illumination from light sources 32, these second reference levels corresponding to the dark output from each CCD pixel. The actual pixel reference threshold levels are set individually for each pixel at a level between each said first reference level and each said second reference level (but closer to said first reference level to heighten sensitivity to optical transitions), and are stored in memory 54 for subsequent use.

Thus, the threshold levels stored in memory 54 are set to produce a logical 0 output from comparators 56 when a biased output corresponding to full light intensity at the pixel in question is provided to the complementary input of the comparators 56. However, when a banknote passes under the CCD array 40, the output level produced by a pixel sensing light transmitted via the banknote then moves higher than the converted analog threshold value, producing a logical 1 output from the corresponding comparator 56. Each comparator output is sent to processing and control unit 50 on data bus 64.

Accordingly, four digital bit streams, corresponding to the four serial analog voltage signals produced by CCD segments 42, 44, 46 and 48, are output from the four comparators 56 and conveyed to the processing and control means 50 in parallel. These digital bit streams each correspond to the 432 pixels in a CCD segment. The combined bit streams indicate the position of the banknote edges across the CCD array 40.

The pixel pitch (e.g. 0.125 mm) of the CCD array 40 in this embodiment of the invention corresponds to a higher resolution than required (e.g. 0.5 mm). The resolution is decreased by combining the bits from groups of four pixel (referred to herein as "pixel groups") in each of the four bit streams as they arrive in series at the processing and control unit 50 to produce a single bit for each group. This also has the advantageous effect of increasing the signal-to-noise ratio for the incoming data. Each combined pixel group bit is produced by a majority voting decision. That is to say, the number of 1s and 0s in each group of four pixel bits determines the majority vote. The "majority" may consist of one, two, three or four pixel bits out of the four in each group, depending on the chosen mode of majority voting operation. In the preferred mode, the majority consists of two or three pixel bits. The result of the four-bit majority voting is that the number of bits is reduced to a quarter. In this embodiment there are 108 pixel group bits remaining for each of the four CCD segments 42, 44, 46 and 48 after the majority voting step.

In order to detect a banknote edge, transitions between the bits are detected. The data is further processed as follows. The 108 pixel group bits derived from each segment of the CCD array 40 after majority voting are divided into 12 sets of bits (referred to herein as "bit sets"), each bit set being made up of 9 adjacent pixel group bits and having a unique address (referred to herein as a "pixel set address"). For the first CCD segment 42, the pixel set addresses (in decimal) are 0–11, for the second segment 44, the addresses are 12–23, for the third segment 46, the addresses are 24–35 and, similarly, for the fourth segment 48 the addresses are 36–47.

The data is processed in parallel in processing and control unit 50, with the first bit sets from each segment (having addresses 0, 12, 24, 36) being stored in shift registers and processed first, followed by the second bit sets from each segment (having addresses 1, 13, 25 and 37) etc. The division into bit sets of 9 pixel group bits, each bit set having a unique address which is expressible in 6 binary bits, produces a means for identification of a transition occurring at a bit set which is a 16 bit data word.

Only data words which contain bit sets indicating transitions are sent to a first in first out (FIFO) memory 58, rather than automatically sending all 48 or any other number of data words. Three stages of analysis are applied to the data to determine which bit sets, if any, indicate a transition.

Firstly, if a transition occurs within a bit set, the data word for the bit set, indicating the location of the transition, is sent immediately to the FIFO memory 58. Such a transition is detected by applying an EQUALS logic function. If all pixel group bits within a bit set have the same logical level (all 1s or all 0s), a "no transition" state is detected within the bit set. If such a "no transition" state is detected, no data word is sent at this stage. Otherwise, a transition occurring within the bit set is registered by processing and control unit 50 and the corresponding data word is sent. Four of these data word send decisions are made for each bit set decoding period, one being made for each segment of the CCD in parallel during that period.

Secondly, the end of each bit set decoding period, the final pixel group bit in the bit set is latched for each CCD segment 42, 44, 46 and 48. If the pixel group bit at the beginning of the next-processed bit set is different from the latched pixel group bit, a transition is detected between the bit sets, and the data word for the current bit set, indicating the location of the transition, is sent to the FIFO memory 58.

Thirdly, transitions occurring between the CCD segments 42, 44, 46 and 48 are also detected. Since all four segments are scanned in parallel, the inter-segment data is evaluated at the end of each scan. The first pixel group bits received from the second, third and fourth segments 44, 46 and 48 are latched and later compared to the final pixel group bits of the last bit set from each of the first, second and third segments 42, 44 and 46 respectively. This indicates whether a transition is present between any of the adjacent segments of the CCD array 40. If so, the data word for the corresponding last bit set, giving the location of the pixel group at which the transition occurred, is sent to FIFO memory 58.

Consider a hypothetical example in which a banknote of 12 mm width is passed under the position sensor in a position corresponding to the first four pixel set addresses. The acquired data, for these four pixel set addresses only, may take a form as follows:

Pixel set address 3(000011) 2(000010) 1(000001) 0(000000)
Pixel group bits 000000000 111111111 111111111 111111000

The banknote spans the fourth and twenty seventh pixel group from the end of the CCD. The data for pixel set addresses 0 and 3 would be transmitted as two data words each containing the pixel set address and the bit set, thus identifying the pixel group locations of the edges of the banknote.

At the end of each line-scan, a unique end-of-line (EOL) data word is sent to the FIFO memory 58. Two successive EOL data words indicate that no transition occurred during a scan, and therefore that no banknote is present.

If more than two edge transitions are detected (for example if the banknote is holed), more than two data words are sent to CPU 60. Thus, the acquired data can be used not only to identify the position of the banknote edges, but also to determine the condition of a sensed banknote. Other defects, such as folded or missing corners, can also be detected by monitoring a number of CCD scans.

The data words stored in the FIFO memory 58 are read by a CPU 60, which may use the acquired positional data to validate the banknote using the surface characteristic sensing heads 20 and 22 downstream from the edge sensor 28.

It will be appreciated that, although DACs were used in the above described embodiment to supply a set of comparators with analog signals for comparison with the analog output signals of the CCD segments, it would also be possible to use an analog to digital converter to convert the analog output from the CCD segments, and digitally compare those converted outputs directly with stored digital threshold values. The DAC solution is however preferred, since it is faster or cheaper.

Furthermore, although four CCD array segments were used in the embodiment described, other quantities may also be used. Similarly, the invention is not limited to the described quantities of pixels or bits used in each pixel group, bit set, data word and/or segment in the above embodiment.

It will also be appreciated that various other modifications, alterations or equivalents could be employed without departing from the spirit or scope of the present invention.

What is claimed is:

1. Apparatus for detecting the location of an edge of a document moving along a transport path, the apparatus comprising light source means, diffusing means for diffusing light from said light source means for illuminating said document, a surface of said diffusing means being adjacent to said transport path so as to contact the document moving along the transport path, a linear light-detector array arranged opposite the light source means and the diffusing means on the other side of the transport path for sensing light transmitted via said diffusing means and the document, and focusing means for generally focusing said light-detector array on both said document and the adjacent surface of said diffusing means.

2. Apparatus according to claim 1, wherein said diffusing means is located below said transport path.

3. Apparatus according to claim 2, wherein said diffusing means is arranged to support said document as it passes along said transport path.

4. Apparatus according to claim 1, wherein said document moves along a transport path immediately adjacent said diffusing means.

5. Apparatus according to claim 1, wherein said diffusing means is a diffusing plate.

6. Apparatus according to claim 1, wherein said light source means comprises a linear array of LEDs.

7. Apparatus according to claim 6, wherein said LEDs are arranged in a current sharing arrangement with a common current generator.

8. Apparatus according to claim 1, wherein said light-detector array is a CCD array.

* * * * *